Nov. 12, 1963     J. G. SUKALA, JR     3,110,516
MAGNETICALLY MOUNTED RESILIENT BUMPER PROTECTOR
Filed July 27, 1960     2 Sheets-Sheet 1
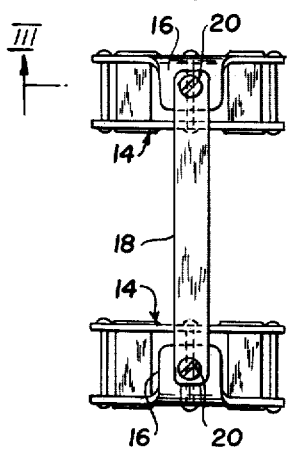
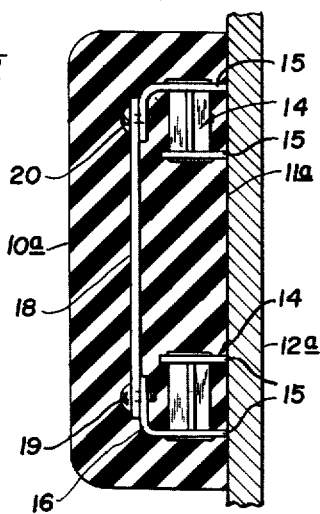
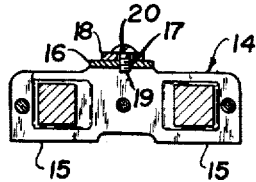
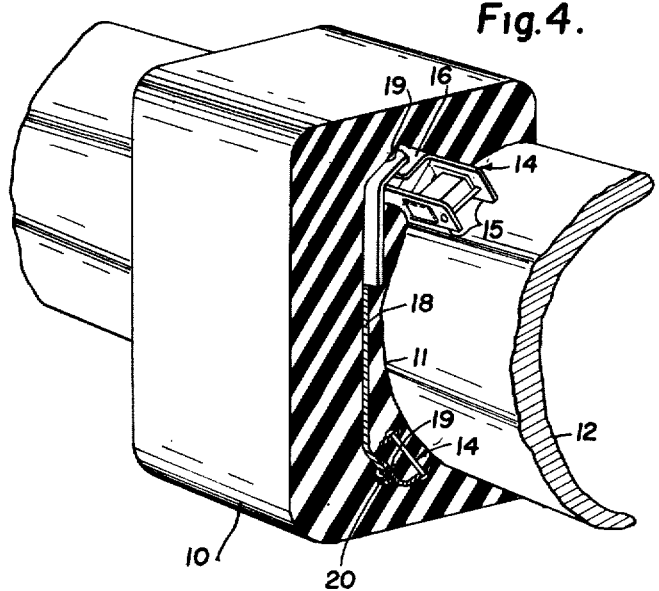
*INVENTOR.*
Justin G. Sukala, Jr.
BY
*his ATTORNEYS*

Nov. 12, 1963     J. G. SUKALA, JR     3,110,516
MAGNETICALLY MOUNTED RESILIENT BUMPER PROTECTOR
Filed July 27, 1960     2 Sheets-Sheet 2
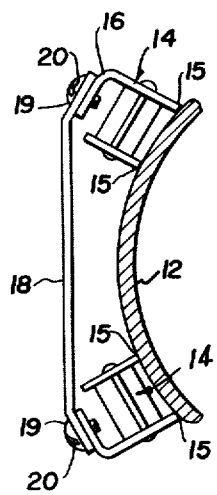
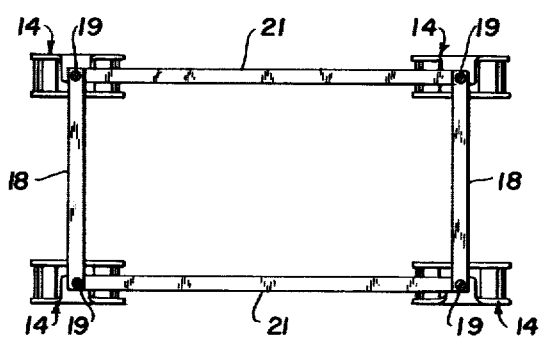
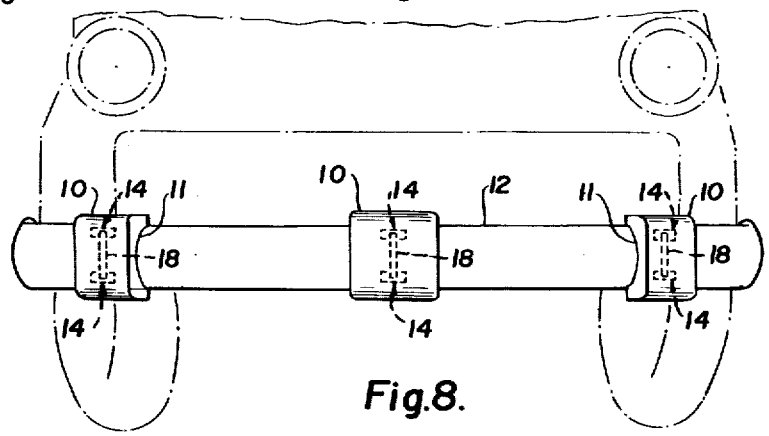
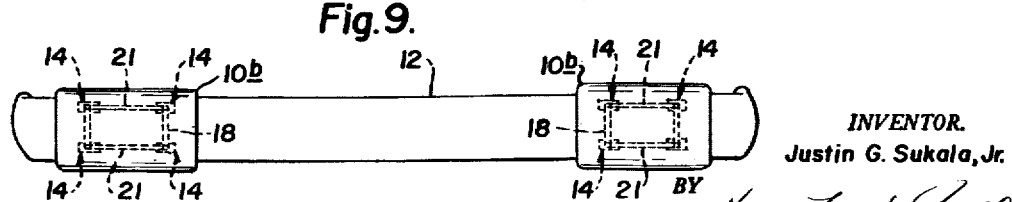
INVENTOR.
Justin G. Sukala, Jr.
BY
his ATTORNEYS United States Patent Office 3,110,516
Patented Nov. 12, 1963

3,110,516
MAGNETICALLY MOUNTED RESILIENT
BUMPER PROTECTOR
Justin G. Sukala, Jr., 1731 Melrose Ave.,
Natrona Heights, Pa.
Filed July 27, 1960, Ser. No. 45,756
4 Claims. (Cl. 293—65)

This invention relates broadly to protecting bumpers on vehicles and more particularly to a protector device that can be quickly and easily applied to the bumper of a vehicle.

It is quite common for the bumpers on vehicles such as automobiles to become scratched up from bumping into various objects in the usual course of operation of such vehicles. With the passage of time, but generally well within the life of an automobile, its bumpers will become quite scratched and otherwise abraded. This permits corrosion to set in and give the bumpers an unsightly appearance. Most cars have bumper guards fixed on their bumpers, and although these offer some measure of protection, bumpers still become abraded and marked up.

My invention will substantially reduce the scratching and abrading of bumpers and greatly extend the new and beautiful appearance of a bumper.

My device is particularly useful when the occasion arises that it is necessary or desirable to push another car or be pushed by another car. The experienced driver will recognize that when one car pushes another the bumpers of each almost invariably get scratched and abraded despite the fact that either or both may have conventional bumper guards thereon.

I provide a bumper protector comprising a tough rubber-like body member having a bearing surface adapted to be fitted against the outside surface of a bumper and permanent magnet means embeddedly fixed in said body member adjacent said bumper whereby said body member is held on said bumper by the magnetic attraction between the magnet means and bumper. The permanent magnet means may comprise a plurality of spaced permanent magnets embeddedly fixed in the body member, each of said magnets having at least one exposed magnetic face substantially flush with the bearing surface of the body member for contact with the outside surface of the bumper.

Preferably, I provide flexible link members to connect the magnets, said link members being wholly embedded in the body member. This provides added assurance that the magnets will not become dislodged or otherwise pull out of the body member. I prefer embedding the permanent magnets in the body member in linked pairs with flexible link between the pairs. This not only insures against dislodgment of the magnets but provides flexible strength to the body member. The body member itself is preferably made of a rubber composition having the characteristics of for example, ordinary tire rubber in that it is tough and durable and yet resilient and is cast thick enough to offer ample protection to the bumper it is positioned on. The body member is cast with the linked magnets positioned therein. Any suitable type of permanent magnets may be employed such as for example Alnico magnets. The power of the magnets may be varied, but I prefer using magnets having a power of about 50 pounds pull. Magnets of this size have sufficient holding power to keep the body member satisfactorily in place even when pushing another car and yet readily permit the removal of the protector from the bumper.

The body member should be cast with a bearing surface similarly contoured to the contour of the bumper it is to protect. Since nearly all bumpers are concavo-convex with the outside surface being convex, the body member is generally cast with a concave bearing surface to snugly fit the bumper. Although I prefer to use the linked magnets in spaced parallel rows in the upper and lower portion of the body member, a single row of linked magnets is also satisfactory. I also prefer to make the protector shorter and use two or more to protect a bumper rather than one long member to protect a whole bumper. The use of shorter protectors simplifies handling and storage.

Thus, I provide a bumper protector which may be applied and removed readily and easily, which will stay in place, which is tough and durable and will protect the surface of a bumper from scratches and abrasions and resulting corrosion even when pushing or being pushed by another car.

Other details, objects and advantages of the invention will become apparent as the following description of certain present preferred embodiments proceeds.

In the accompanying drawings, I have shown certain present preferred embodiments of the invention in which FIGURE 1 is a frontal elevational view of the magnetic portion of the bumper protector;

FIGURE 2 is a transverse sectional view of an embodiment of the invention applied to a bumper with the magnetic portion in elevation;

FIGURE 3 is a sectional view taken on the line III—III of FIGURE 1;

FIGURE 4 is an isometric view partly in section of a preferred embodiment of the invention applied to a bumper;

FIGURE 5 is a side elevational view partly in section of the magnetic portion of the invention shown applied to a bumper;

FIGURE 6 is an elevational view of the magnetic portion of a modified embodiment of the invention;

FIGURE 7 is an elevational view illustrating another embodiment of my bumper protectors applied to a bumper;

FIGURE 8 is an elevational view illustrating another embodiment of my bumper protector applied to a bumper and FIGURE 9 is an elevational view of still another embodiment of my bumper protector applied to a bumper.

Identical parts in the various embodiments shown in the drawings have been given the same reference numbers.

Referring now to the drawings, and initially to FIGURE 4, I provide a rubber block 10 having a concave surface 11 of substantially the same curvature as the convexly shaped bumper 12 so that a relatively good fit occurs when my protector is placed on the bumper. Block 10 is a relatively thick block of rubber such as ordinary tire rubber which is resilient yet very tough and durable. To hold block 10 on bumper 11, I provide permanent magnets 14 substantially embedded in block 10 with only their polar extremities 15 exposed for direct contact with bumper 12.

The structure of permanent magnet 14 is best shown in FIGURE 3. Its structure is familiar to those skilled in the art and will not be gone into in detail. It should be noted however that magnet 14 has polar extremities 15 and a connector flange 16. The flange 16 having a threaded hole 17 therein. Preferably, magnets 14 are embedded in block 10 in pairs whereby one magnet 14 is in the upper portion of block 10 adjacent the upper portion of bumper 12 and the other magnet 14 is in the lower portion of block 10 adjacent the lower portion of bumper 12. In this manner slippage is minimized because the magnetic attraction between magnets 14 and bumper 12 is spread over a larger balanced area.

Although the power of magnets 14 may be varied considerably, I find that I prefer using permanent magnets having a pull of about 50 pounds. These have sufficient power to hold block 10 in position well and yet are not so large as to make removal difficult. Also, the expense of larger magnets would seriously raise the manufacturing cost of the device.

In order to assure that magnets 14 do not pull out of block 10, I provide a connecting strap 18 which is wholly embedded in block 10, as shown in FIGURE 4, which is attached to flange 16 by threaded screw 19 to connect the magnets together and keep them from working apart or pulling out of block 10. Strap 18 may be made of flexibly resilient metal so that it will move with the rubber in block 10 when pressure is applied to block 10 as in pushing another car, and then resiliently return to its initial position when said pressure is removed. Strap 18 not only prevents magnets 14 from pulling out but also strengthens block 10 and minimizes any tendency of block 10 to spread and split along the center. Screw 19 has a slotted head 20, and being embedded in block 10 the rubber fills in slot 20 and prevents screw 19 from turning and working loose.

Referring now to FIGURE 7, I show my present preferred embodiment as applied to the bumper of an automobile. I prefer the use of several smaller protectors rather than a single long one simply because the smaller protector is easier to handle. In the view of FIGURE 7 I show three of my protectors spaced along and applied to the bumper 12. This arrangement protects the bumper exceptionally well even when pushing another automobile. The magnetic attraction between magnets 14 and bumper 11 being most adequate in keeping the protectors in place thereon.

In another presently preferred embodiment, shown in FIGURES 1 and 2, the block 10a has a flat surface 11a because it is for use with bumpers such as flat surfaced bumper 12a. Otherwise the embodiment is substantially the same as the first described embodiment.

In another preferred embodiment shown in FIGURES 6 and 9, two pairs of magnets 14 are embedded in a larger block 10b. In this embodiment the magnets are linked into pairs by straps 18 as earlier described and in addition are cross-linked by additional straps 21 to form a parallelogram arrangement. This arrangement supports a much larger block 10b on bumper 12 as shown in FIGURE 9.

Still another embodiment of my invention is shown in FIGURE 8, wherein magnets 14 connected by straps 21 are embedded and spaced laterally along only the top portion of block 10c. This arrangement supports a relatively longer bumper protector with a less number of magnets 14 than in the last described embodiment.

The described embodiments all protect an automobile bumper from scratches and abrasions that occur in normal driving and particularly when pushing or being pushed by another car. They are easily attached to a bumper, the operator simply puts them on the bumper so that matching contours of the protector and the bumper substantially coincide and thereafter the magnets hold it in place. They are just as easily removed by sliding them down and off the bumper.

While I have shown and described present preferred embodiments of the invention, it is to be distinctly understood that the invention is not limited thereto but may be otherwise variously embodied within the scope of the following claims.

I claim:

1. A bumper protector, for metallic vehicle bumpers made of magnetic materials, comprising a tough resilient body member having a surface adapted to be fitted against the outside of said vehicle bumper, a plurality of spaced permanent magnet elements embeddedly fixed in said body member having linking means embedded in said body member connecting said magnet elements, said magnet elements having magnetic portions thereof adjacent to and substantially flush with said surface of the body member whereby the body member is adapted to be held on said bumper by magnetic attraction when said body member is fitted to said bumper.

2. A bumper protector as claimed in claim 1 wherein said plurality of permanent magnet elements comprises a pair of magnet elements spaced vertically whereby when the protector is fitted against the bumper said magnet elements are disposed respectively near the top and bottom of said bumper.

3. A bumper protector as claimed in claim 1 wherein said plurality of permanent magnet elements are spaced horizontally in said body member whereby when the protector is fitted against the bumper said magnet elements are disposed near the top of said bumper.

4. A bumper protector as claimed in claim 1 wherein said plurality of permanent magnet elements comprises two pairs of magnet elements spaced in a parallelogram configuration with linking means embedded in the body member connecting the magnet elements of each pair and additional linking means embedded in the body member connecting the pairs.

References Cited in the file of this patent

UNITED STATES PATENTS

| | | |
|---|---|---|
| 241,126 | Drake | May 10, 1881 |
| 1,744,408 | Millard | Jan. 20, 1930 |
| 1,932,143 | Piercy | Oct. 24, 1933 |
| 2,217,514 | Henry | Oct. 8, 1940 |
| 2,271,046 | Sing | Jan. 27, 1942 |
| 2,385,859 | Jacobson | Oct. 2, 1945 |
| 2,414,653 | Lookholder | Jan. 21, 1947 |
| 2,555,795 | Koch | June 5, 1951 |
| 2,624,607 | Weigand | June 6, 1953 |
| 2,659,169 | Brennan | Nov. 17, 1953 |
| 2,844,291 | McPheeters | July 22, 1958 |
| 2,875,324 | Camp et al. | Feb. 24, 1959 |
| 2,958,019 | Scholten et al. | Oct. 25, 1960 |

UNITED STATES PATENT OFFICE
CERTIFICATE OF CORRECTION

Patent No. 3,110,516                                    November 12, 1963

Justin G. Sukala, Jr.

It is hereby certified that error appears in the above numbered patent requiring correction and that the said Letters Patent should read as corrected below.

Column 1, line 37, for "magnet" read -- magnets --; line 53, after "with" insert -- a further --.

Signed and sealed this 28th day of April 1964.

(SEAL)
Attest:

ERNEST W. SWIDER                                    EDWARD J. BRENNER

Attesting Officer                                         Commissioner of Patents